Nov. 11, 1952 F. G. HALL Re. 23,574

HAIRPIN

Original Filed Jan. 26, 1952

Inventor
Frank G. Hall by Parker & Carter
Attorneys

Reissued Nov. 11, 1952

Re. 23,574

UNITED STATES PATENT OFFICE 23,574

HAIRPIN

Frank G. Hall, Chicago, Ill., assignor to Halgar Incorporated, Chicago, Ill., a corporation of Illinois Original No. 2,599,447, dated June 3, 1952, Serial No. 268,359, January 26, 1952. Application for reissue August 5, 1952, Serial No. 302,858

6 Claims. (Cl. 132—50)

Matter enclosed in heavy brackets [ ] appears in the original patent but forms no part of this reissue specification; matter printed in italics indicates the additions made by reissue.

My invention relates to improvements in hair pins or curlers and has for one object to provide a type of hair curler which can be used in connection with the formation of all kinds of curls made of human hair.

One object of my invention is to provide a curler which can be easily applied and wherein the woman does not need to use her teeth or her finger nails to open it as she does with the well known type of bobbie pin.

Another object of my invention is to provide a hair pin or curler wherein excessive pressure on the hair is avoided. This is of the utmost importance because experience has taught that those curlers which apply substantial pressure to the hair in forming a curl tend to weaken and cause breaking of the individual hairs.

Another object of my invention is to provide a curler which while it holds the curl, is not kept open by the curl, so that the danger of the curler slipping off is minimized. The fact that the curler remains closed during use makes it much more comfortable to wear especially when asleep.

Other objects will appear from time to time throughout the specification and claims.

My invention is illustrated more or less diagrammatically in the accompanying drawing, wherein Figure 1 is a plan view of one form of my curler;

Like parts are indicated by like characters throughout the specification and drawing.

Figure 1:
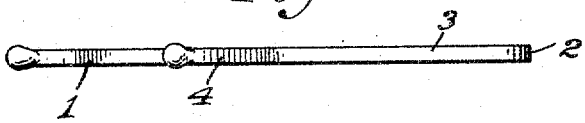
Figure 2:
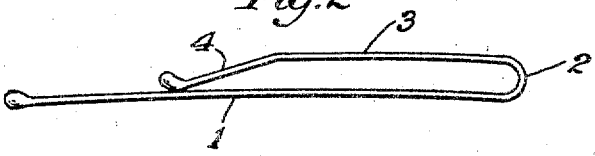
Figure 2 is a side elevation of Figure 1.

Referring to Figures 1 and 2, 1 is the long leg of the pin or curler. It is joined by a spring loop 2 to the short leg 3. The short leg 3 terminates in a downwardly inclined portion 4, the end of which engages the long leg 1 intermediate its ends. Both legs are shown tipped with an enlarged tip to prevent scratching or cutting the woman's head. The legs 1 and 3 are generally rectilinear, and spaced apart in general parallelism, and with the loop 2 and inclined end 4 define a closed loop or pocket for the hair.

Figure 3:
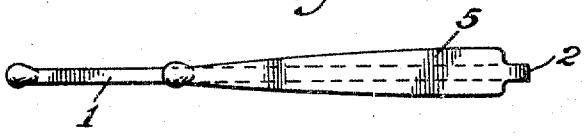
Figure 3 is a plan view of a modified form.

In the modified form shown in Figure 3, the short leg 3 is widened as at 5. The loop 2 is the same as in Figure 2, and the only difference is that the widened portion 5 forms a sort of handle, being wider than the leg 1 but preserving the same relationship to the leg 1 as is characteristic of Figure 2. The widened portion 5 tapers down to substantially the same width as the leg 1 where they come in contact.

Figure 4:
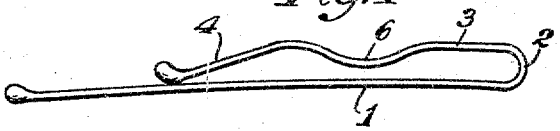
Figure 4 is a side elevation of another modified form.

In the modified form shown in Figure 4, the short leg is inwardly depressed as at 6 toward the leg 1, thus centrally reducing the width of the pocket between the long and short legs. The short leg in this case may be of the same width as the long leg or have the widened handle shown in Figure 3. The depression 6, as illustrated, does not actually engage the long leg 1 though it might without changing the operation of the device.

Figure 5:
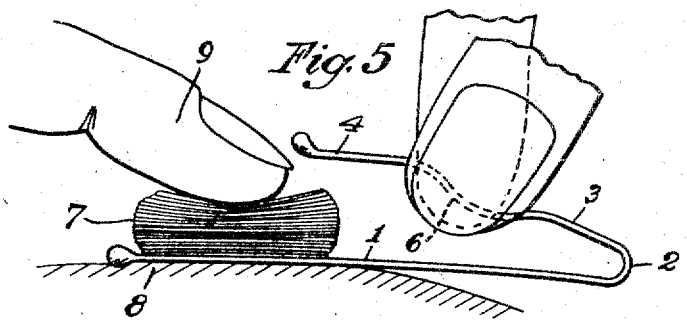
Figure 5 illustrates the way in which my curler is applied.
Figure 7:
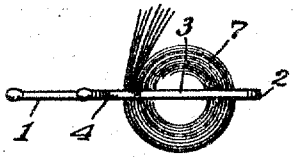
Figure 7 is a plan view of the curler in position.
Figure 6:
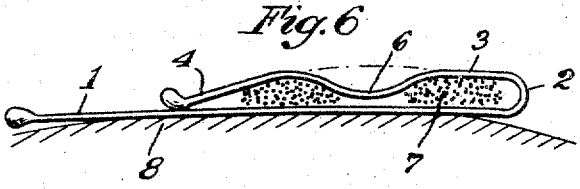
Figure 6 is a side elevation of the curler in place on a pin curl.

Figures 5, 6 and 7 illustrate the use of the device. 7 is the usual pin curl which the user has wound up in any suitable, customary manner so that it is very close to the surface of the head 8. 9 is the user's finger placed upon the curl to hold it in place upon the head. The thumb and fingers of the other hand grasp the short leg of the curler and the long leg is inserted under the curl and under the finger 9. Then the fingers of the other hand pull up against the pressure of finger 9 to open the curler. Then the open curler may be slid across the curl and when the tension is released it assumes the position of Figure 6.

In Figures 5 and 6, I have illustrated the use of the curler of Figure 4. In this case, the depression penetrates the central portion of the curl and holds the opposite sides of the curl in proper relative position.

Figure 7 shows the same arrangement except that the device of Figure 2 is shown. In this case the curl is merely held between the long and short legs and kept in place by the compression of the curl.

Even though the pocket between the long and short legs provides a substantial clearance between the two legs, the clearance is less than the ordinary uncompressed total thickness of the pin curl so that there is a sufficient pressure on the curl to hold the curler in place and the curl in proper shape. This is in sharp contrast with the conventional bobbie pin because here the pressure is limited by the structure of the curler and as a result excessive pressure is not applied to the hair.

Figure 8:
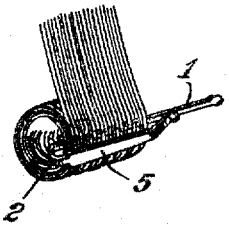
Figure 8 illustrates the curler as applied to a long curl.

Figure 8 illustrates my curler as applied to a loose, round or tubular curl. The strand of hair wound about the finger of the user or any other mandrel of form is held in curl by the thumb of the hand manipulating the curl. The user then taking the curler in the other hand inserts the long leg into the curl in general parallelism with the axis of the curl beneath the thumb holding the curl. He then pulls up on the short leg causing the curler to open. Further longitudinal movement of the curler causes complete penetration of the curl and when the tension is released the curler remains in the position of Figure 8 holding the curl in shape.

The use and operation of my invention are as follows:

There are in general two kinds of curls made on the female head, to both of which my curler is especially applicable. A long or tubular curl is one which is rolled up against the wearer's head but not necessarily flat against it. In this case the axis of the curl is generally parallel to a tangent to the woman's head rather than perpendicular as is characteristic of the pin curl. Pin curls are those curls which lie flat on the wearer's head.

The wearer makes the pin curl, then holds it tightly against her head with one hand. She then opens a bobbie pin with her teeth or finger nail, slips her finger between the two legs of the bobbie pin to hold it open and slides one leg under, the other leg over the curl. The difficulty with this is that since her finger is between the two legs of the pin she tends to deform the curl as she presses it against her finger. This makes the bobbie pin difficult to apply and also tends to spoil the curl.

One leg of my curler is much longer than the other, so the user holds the curler between thumb and finger, slides the long leg under the curl and under her finger, pulls up on the short leg to open the curler and slides it across and beneath the curl. As soon as she releases the short leg, the curler closes down and holds the curl but does it by surrounding it on two sides without the excessive pressure which tends to break the hair strands. This results from the fact that the shorter shank or leg of the curler is out of contact with the longer shank except at its ends and so forms a kind of pocket to contain the curl.

As will be observed in Figure 5, the long leg extends considerably beyond the end of the short leg so as to permit the finger of the user to exert pressure flatwise relative to the long leg without contacting the end of the short leg. Because of this arrangement, the long leg can be initially inserted beneath the curl and held down by the position shown in Figure 5, without interference with the finger which is holding the long leg. Also, the end of the short leg can then be raised or lowered to the proper level for sliding it over the curl without interference with the finger which is holding curl and long leg against the scalp.

In the modified form, the short leg intermediate its ends is bent inwardly toward the long leg, so as to form a projection to divide the pocket into two sections, thus each section holds a diametrically opposite side of the curl to prevent displacement of the curler or deformation.

Both the long and the short shank may be of the same width. Under some circumstances, however, the shorter leg will be wider, thus forming a kind of handle so that when the user holds the curler between the thumb and finger, the contact is primarily with the wide handle and there will be then no interference by the thumb and finger with the relative downward movement of the longer shank.

This widened handle portion is located between the spring loop where the two shanks or legs are joined and the end of the short leg and tapers down so that at the point of contact between the short shank and the long one, their widths are substantially uniform.

The widened portion does not include the spring loop because only a very slight pressure is required to hold the end of the short leg in contact with the long leg intermediate its ends. The handle must terminate at the other end in an element of substantially the same thickness as the long leg in order that it may easily be withdrawn from the hair.

All forms of the curler either with or without the widened handle or with or without the central depression in the short shank are equally applicable to a pin curl.

When my curler is used with the tubular or round curl, the wearer after winding the curl around her finger or any suitable mandrel, holds the curl with her thumb, with the other hand inserts the long leg of the curler into the curl, the long leg being generally parallel with the axis of the curl in contra distinction to the application of the pin curl where the leg is perpendicular to the curl axis. As soon as the projecting end of the long leg is in the curl and under the thumb holding the curl, then the user lifts up on the short leg, the thumb holding the long leg down. This opens the self-opening curler. The curler can then be thrust through the curl. As soon as the tension is released, the inclined end of the short leg will contact the long leg and the curl will be held within the pocket formed between the two legs.

Because, even with the hair gripped by the curler, the curl is not held open, there are no projecting spaced points to catch on bedclothes or parts of the body. The only projections are the single end of the long shank which lies flat on the head and loop which joins the two shanks or legs at the other end and no matter how big or thick the curl, the two members gripping the curl assume the same position with respect to one another that they do before application.

This is a striking advantage over the type of clip or clasp which has parallel legs of the same length or the usual form of bobbie pin where the two legs are substantially in engagement because the curl holds them apart and is gripped between outwardly inclined walls which constantly tend to slip off the curl.

Even the corrugations characteristic of the usual bobbie pin while they resist withdrawal, nevertheless because they are on outwardly inclined members still tend to slip off and it is well known that women habitually find bobbie pins in bed in the morning, pins which have slipped off in the night, thus causing discomfort but more than that, losing some of the curls. This cannot happen with my curler because the curl is always held in a pocket which remains closed except when the user purposely removes the curler.

I claim:

1. A hair pin comprising spaced apart, generally parallel, rectilinear, long and short legs, joined at one end by a spring loop, the free end of the short leg terminating in a relatively straight portion inwardly inclined toward and held against the long leg short of the end thereof by the tension of the spring loop the long leg extending beyond the free end of the short leg a distance to permit flatwise pressure of the finger of the user relative to said long leg without contact with the short leg, the short leg being of substantially greater width than the long leg to provide a handle more easily contacted by the fingers of the user.

2. A hair pin comprising spaced apart, generally parallel, rectilinear long and short legs, joined at one end by a spring loop, the free end of the short leg terminating in a relatively straight portion inwardly inclined toward and held against the long leg short of the end thereof by the tension of the spring loop the long leg extending beyond the free end of the short leg a distance to permit flatwise pressure of the finger of the user relative to said long leg without contact with the short leg, the short leg being of substantially greater width than the long leg to provide a handle more easily contacted by the fingers of the user, the widened portion of the short leg decreasing in width so that at point of contact between the two legs their widths are substantially the same.

3. A hair pin comprising spaced apart, generally parallel, long and short legs, joined at one end by a spring loop, the free end of the short leg terminating in a relatively straight portion inwardly inclined toward and held against the long leg short of the end thereof by the tension of the spring loop, the short leg intermediate its ends having a single curve extending toward but spaced away from the long leg, such curve being approximately equidistant from the ends of the short leg and defining two spaced curl enclosing areas between the two legs, said areas being of equal height between the legs and of substantially equal cross-sectional area.

4. A hair pin comprising spaced apart, generally parallel, rectilinear, long and short legs, joined at one end by a spring loop, the free end of the short leg terminating in a relatively straight portion, inwardly inclined toward and held against the long leg short of the end thereof by the tension of the spring loop, the short leg, immediately adjacent the spring loop, being of substantially greater width than the longer leg and tapering in width from the spring loop to the free end of said short leg.

5. A hair pin comprising spaced apart long and short legs joined at one end by a spring loop, said legs and loop being made of light flexible [wire] *material* permitting the legs to be readily spread apart by the fingers of the user, the short leg consisting of a straight portion, extending the major part of its length and a shorter terminal portion inclined inwardly toward the long leg with its extreme end normally held closely against the long leg by the tension of the spring loop to maintain said major portion of the short leg in spaced parallel relation with the long leg, the long leg extending beyond the extreme end of the short leg a distance to permit flatwise pressure of the finger of the user relative to said long leg without contact with the short leg.

6. A hair pin comprising long and short legs joined at one end by a continuous spring loop, the short leg being spaced apart from the long leg for the major part of its length, and having a shorter terminal portion inwardly inclined toward the long leg with its extreme end normally held closely against the long leg by the tension of the spring loop to maintain the opposite ends of said major portion in equally spaced relation with the long leg, the long leg extending beyond the extreme end of the short leg a distance to permit flatwise pressure of the finger of the user relative to said long leg without contact with the short leg, and the legs and loop being made of flexible [wire] *material* permitting the legs to be readily spread apart by the fingers of the user.

FRANK G. HALL.

REFERENCES CITED

The following references are of record in the file of this patent or the original patent:

UNITED STATES PATENTS

| Number | Name | Date |
|---|---|---|
| D. 133,785 | Reynolds | Sept. 15, 1942 |
| 803,464 | Beck | Oct. 31, 1905 |
| 1,796,487 | Naito | Mar. 31, 1931 |
| 1,799,510 | Goldberg et al. | Apr. 7, 1931 |
| 2,528,527 | Lavanish | Nov. 7, 1950 |

FOREIGN PATENTS

| Number | Country | Date |
|---|---|---|
| 361,494 | Great Britain | Nov. 26, 1931 |